United States Patent [19]

Strupczewski

[11] 4,373,576
[45] Feb. 15, 1983

[54] HEATING, VENTILATING AND AIR CONDITIONING SYSTEM WITH REVERSIBLE AIR FLOW

[76] Inventor: Kenneth Strupczewski, 5213 Windward La., Bensalem, Pa. 19020

[21] Appl. No.: 222,948

[22] Filed: Jan. 8, 1981

[51] Int. Cl.³ ............................................. F25B 29/00
[52] U.S. Cl. .................................... 165/48 R; 165/97; 165/122; 165/137; 236/DIG. 9
[58] Field of Search ........................ 165/40, 48, 50, 97, 165/122, 127, 137, 2; 236/DIG. 9; 98/33 A; 237/46, 49; 62/186

[56] References Cited

U.S. PATENT DOCUMENTS

| | | | |
|---|---|---|---|
| 2,139,262 | 12/1938 | Euwer | 165/42 |
| 2,463,322 | 3/1949 | Sewell et al. | 165/97 X |
| 2,550,754 | 5/1951 | Baker | 165/137 |
| 3,653,431 | 4/1972 | Loveley | 165/137 X |
| 3,749,157 | 7/1973 | Davison | 165/137 X |
| 4,076,074 | 2/1978 | Tompkins | 165/48 |
| 4,267,967 | 5/1981 | Beck et al. | 236/DIG. 9 |
| 4,271,898 | 6/1981 | Freeman | 165/16 |

FOREIGN PATENT DOCUMENTS

| | | | |
|---|---|---|---|
| 853202 | 10/1952 | Fed. Rep. of Germany | 165/137 |
| 999317 | 7/1965 | United Kingdom | 165/40 |

*Primary Examiner*—Samuel Scott
*Assistant Examiner*—Margaret A. Focarino
*Attorney, Agent, or Firm*—Daniel E. Kramer

[57] ABSTRACT

An air supply and return system for heating and cooling a room, including an air flow loop having a first set of openings positioned high in a wall of the room (high vents) and a second set of openings positioned low in a wall of the room (low vents). The air flow loop includes a reversible air moving device, heating and cooling coils, and ducts connecting the reversible air moving device, filters, and the heating and cooling coils to the high vents and the low vents. During the cooling cycle, air is withdrawn from the room through the low vents, circulated with high air flow by the air mover through the ducts, filter, and the cooling coils, and discharged to the room from the high vents. During the heating cycle the air mover, and thereby the direction of air flow within the duct system, is reversed. Heating operation is in two stages: a passive heating stage with low air flow during which warm, stratified air from the upper portion of the room is withdrawn therefrom through the high vents and circulated unheated through the duct system and discharged to the lower part of the room through the low vents, thereby minimizing stratification within the room; and an active heating stage with higher air flow during which the air withdrawn from the room through the high vents is heated and returned to the room through the low vents.

6 Claims, 6 Drawing Figures

HEATING, VENTILATING AND AIR CONDITIONING SYSTEM WITH REVERSIBLE AIR FLOW

BACKGROUND OF THE INVENTION

1. Field of the Invention

My invention is directed toward air flow systems for heating and cooling spaces. My system is further directed toward such systems which withdraw air from the space, condition it by heating or cooling, and then return the conditioned air to the space. My invention is further directed toward such systems and conditioning where the direction of the air flow within the air conveying means is in one direction during the heating cycle and in the opposite direction during the cooling cycle. My invention is further directed toward such systems where one end of the air conveying and conditioning means is positioned in the floor or in the wall close to the floor and the other end of the air conveying means is positioned in the ceiling or in a wall near the ceiling and where the air is withdrawn from the top of the room, heated and discharged near the bottom of the room during the heating cycle, and where, through the same ducts, but with reversed air flow, the air is withdrawn from the bottom of the room and discharged near the top of the room during the cooling cycle.

2. Description of the Prior Art

All systems for heating and cooling known to the inventor which utilize air to convey the heating or cooling effect to a space, employ ducts and air inlets and air outlets through which the air direction is invariant. Examples of such prior art systems employed for both heating and cooling are set forth in the following chapters of the 1980 "Systems" Handbook published by the American Society of Heating, Refrigerating and Air Conditioning Engineers: Chapter 3, "All Air Systems"; Chapter 11, "Applied Heat Pump Systems"; Chapter 12, "Forced Air Systems". The reference does suggest at page 12.3 that cooling results will be best if the air is discharged high in the room and heating results will be best if the air is discharged low in the room.

Though the reference discloses complex duct arrangements with dual sets of outlets, some positioned high for cooling which remain unused during heating, others positioned low for heating which remain unused during cooling, and dampers to select the proper outlets for the desired function, the direction of the air in the ducts is always unidirectional and no outlet for one function ever functions as an inlet for the other function. By contrast, my invention discloses a simple duct system which need not require any dampers at all, but by the use of a reversible fan, secures the desired superior performance in the distribution of cooled air through vents placed high in the room; distribution of warm air through vents placed low in the room, and achieves these superior results at low cost without the costly provision of extra ducts and outlets, some of which always remain unused.

BRIEF SUMMARY OF THE INVENTION

It is well known to those expert in the art and science of heating and air conditioning that best cooling effect is achieved when the cooled air is discharged high into the conditioned room and the best heating effect is achieved when the warmed air is discharged low into the room to be heated. Ordinary domestic and commercial air conditioning systems use the same air outlet for both heating and cooling. Designers generally position the air outlet in the room as a compromise between excellent performance during heating and excellent performance during cooling. In cold climates, where heating is the primary function, and air conditioning is secondary, the air outlets are generally placed low in the room to secure the most effective heating performance and the degraded air conditioning performance is accepted. In warm climates, the air outlets are generally placed high in the room for most satisfactory air conditioning performance and the degraded heating performance is likewise ignored. Systems of the highest cost and quality provide dual air outlets, one set located high in the room for cooling, the other set located low in the room for heating, and separate duct systems with appropriate controls, including dampers, for directing the cooled air to the high outlet during cooling and warmed air to the low outlet during heating. Dual outlet systems of this sort, which provide the greatest comfort and efficiency for both the heating and the cooling cycles, are generally found only in luxury homes or high rental office buildings.

It is an object of my invention to provide correctly positioned outlets for both heating and cooling to secure excellent heating and excellent cooling performance without compromise; yet to achieve these excellent results with low cost of construction and great operational simplicity, thereby allowing the application of my system even to the most moderate priced housing. Further, by eliminating compromise in the positioning of the air outlets, the more efficient heating or cooling provides substantial energy conservation through reduced temperature stratification within the room.

My invention teaches a forced circulation heating and cooling system for a room including at least two registers for air flow into and out of the room; a high register located in the ceiling or a wall adjacent the ceiling, having a relatively small face area; and a low register located in the floor or a wall adjacent the floor, having a relatively large face area; and a duct system, including a reversible multispeed fan and heating and cooling coils for providing air flow communication between the high and the low registers. With the fan operating at its highest speed and blowing toward the high register, the system will be in its cooling mode and air will be discharged through the relatively small high register at a relatively high velocity to create satisfactory air throw and sufficient air turbulence within the room for human comfort during the cooling cycle. With the fan reversed and blowing toward the low register in its lowest speed condition for heating, the high register will remove stratified warm air from the top of the room and redistribute it at low velocity to the relatively large low register to eliminate energy-wasting temperature stratification between active heating cycles. When the temperature in the room falls below a predetermined degree, the heating coil within the duct system will be energized and the fan, while continuing to blow toward the low register, will increase in speed and will discharge heated air through the relatively larger low register at a moderate velocity consonant with effective heating performance.

DETAILED DESCRIPTION OF THE INVENTION

Figure 1:
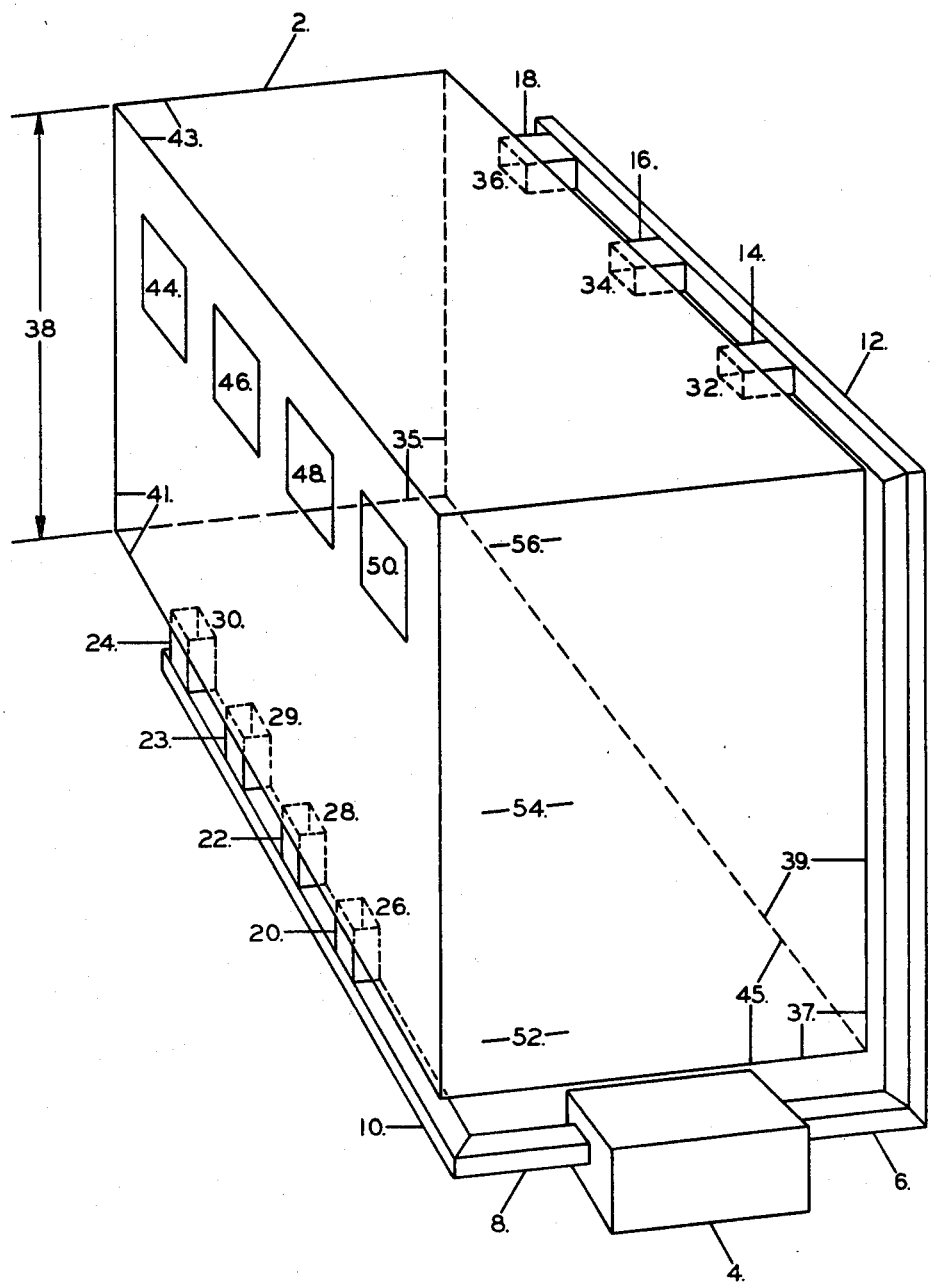
FIG. 1 shows a room having high registers and low registers and an external ducting system joining them.

FIG. 1 shows a room 2 intended typically for human occupancy though not restricted thereto. The room 2 has opposite side walls 35 and 37, opposite long walls 39 and 41, with long wall 41 containing windows 44, 46, 48 and 50, typically communicating to the outdoors; a ceiling 43 and a floor 45. On wall 37, a low level 52 and an intermediate level 54, and a high level 56 are indicated.

In floor 45 at low level air vents 30, 28, 26 and 29 are located. Although these are shown in the floor, it should be understood that fully equivalent operation would result if the outlets were located in the wall at low level 52 and that reference to an air vent at a low level, though shown in the floor, is intended to be construed as being in the wall at a low level or in the floor. The vents 26, 28, 29 and 30 are connected to duct manifold 10 by way of stubs 20, 22 23 and 24 respectively. The manifold 10 is connected by duct 8 to an air conditioning chamber 4, which, in turn, is connected via duct 6 to common duct manifold 12. Duct manifold 12 is connected in turn to high level outlets 32, 34 and 36 by duct stubs 14, 16 and 18 respectively. It is my intention that reference to vents in a high level position in the room be construed to apply equally to wall vents in the high position or to vents located in the ceiling and that these two positions are for the purpose of this disclosure functionally completely equivalent.

Air conditioning chamber 4 contains a reversible fan and coils for heating and cooling the air that is circulated through the air conditioner by the fan.

Figure 2:
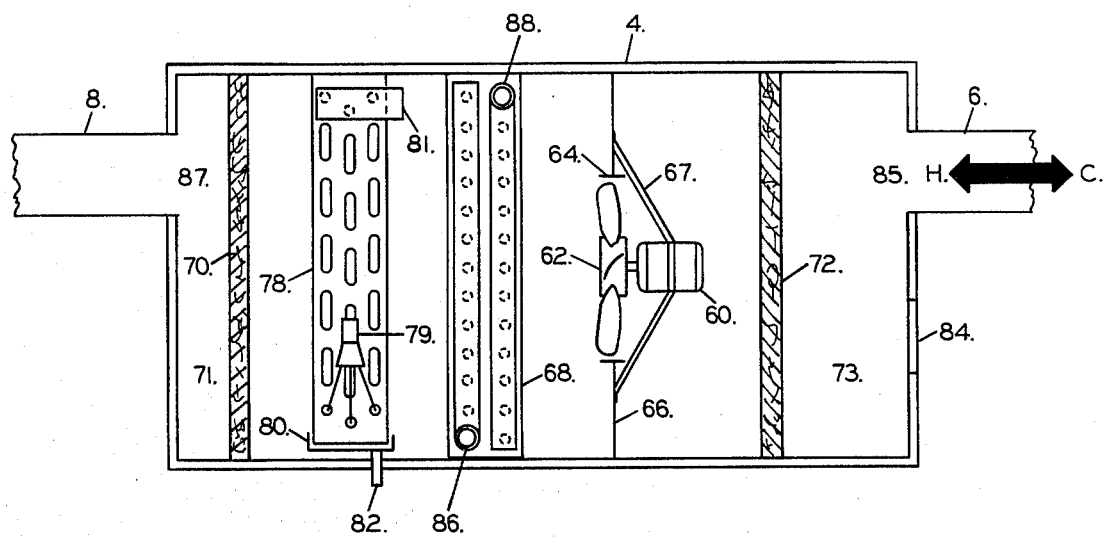
FIG. 2 shows a cross section of a heating and air conditioning package including filters, heating coil, cooling coil, and a reversible fan with sound attenuator.

FIG. 2 shows a cross section in elevation of the air conditioning unit 4. Within the enclosure of unit 4 are at least the following components: first air filter 70, cooling coil 78, heating coil 68, axial flow fan 62 driven by reversible motor 60, sound attenuator 64 and second air filter 72. Casing 4 has openings 85 and 87 for providing communication with the low vents via duct 8 and the high vents via duct 6.

Although the heating means are not otherwise specified, they may be in the nature of a hot water boiler supplying heated water to the heating coil 68 in FIG. 2 or a furnace heating an equivalent heat exchanger in the same position as coil 68 in FIG. 2.

Motor 60 may be of any reversible type, such as permanent split capacitor, split phase, capacitor start, or poly-phase, though the capacitor start and run, single phase type motor is preferred. The motor 60 must have power sufficient to drive fan 62 and the combination of the motor and fan must be sufficient to circulate sufficient air through the resistances of the heating and cooling coils, filters, ducts and air inlets and outlets to satisfy the needs of the system; typically, about 450 cu. ft/min. of air per ton of air conditioning and about 300 cu/ft/-min. of air for the 24,000 Btu/hr. of heating which would normally be supplied with each ton of air conditioning.

Fan 62 may be of any type which, when driven at the speed of motor 60, will produce adequate air flow against the resistance of the system, typically 0.5" of water pressure differential.

Figure 3:
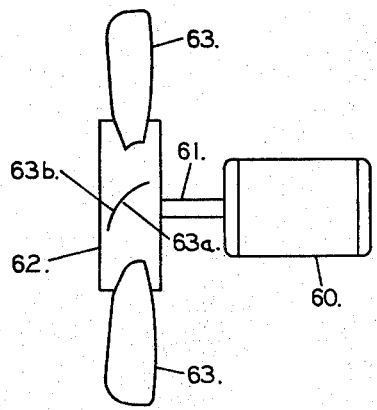
FIG. 3 is a detail of the reversible fan.

FIG. 3 is a detail of the fan 62 shown connected to motor 60 by its shaft 61; three blades 63 are visible. The motor will be operated so that the concave faces of the blade 63A strike the air during air conditioning operation when the highest air flow is required. During heating operation, when lower air flow is required, the motor will be reversed and the convex side of the fan blades 63B will strike the air producing the desired, somewhat lower air flow required for most satisfactory heating operation.

In FIG. 2 sound attenuator 64 serves to reduce the intensity of fan noise generated by the relatively high speed operation of the axial flow fan. The housing 4 of the air conditioning and heating unit will be insulated with foam insulation 84, typically 2" of urethane foam being employed.

Figure 4:
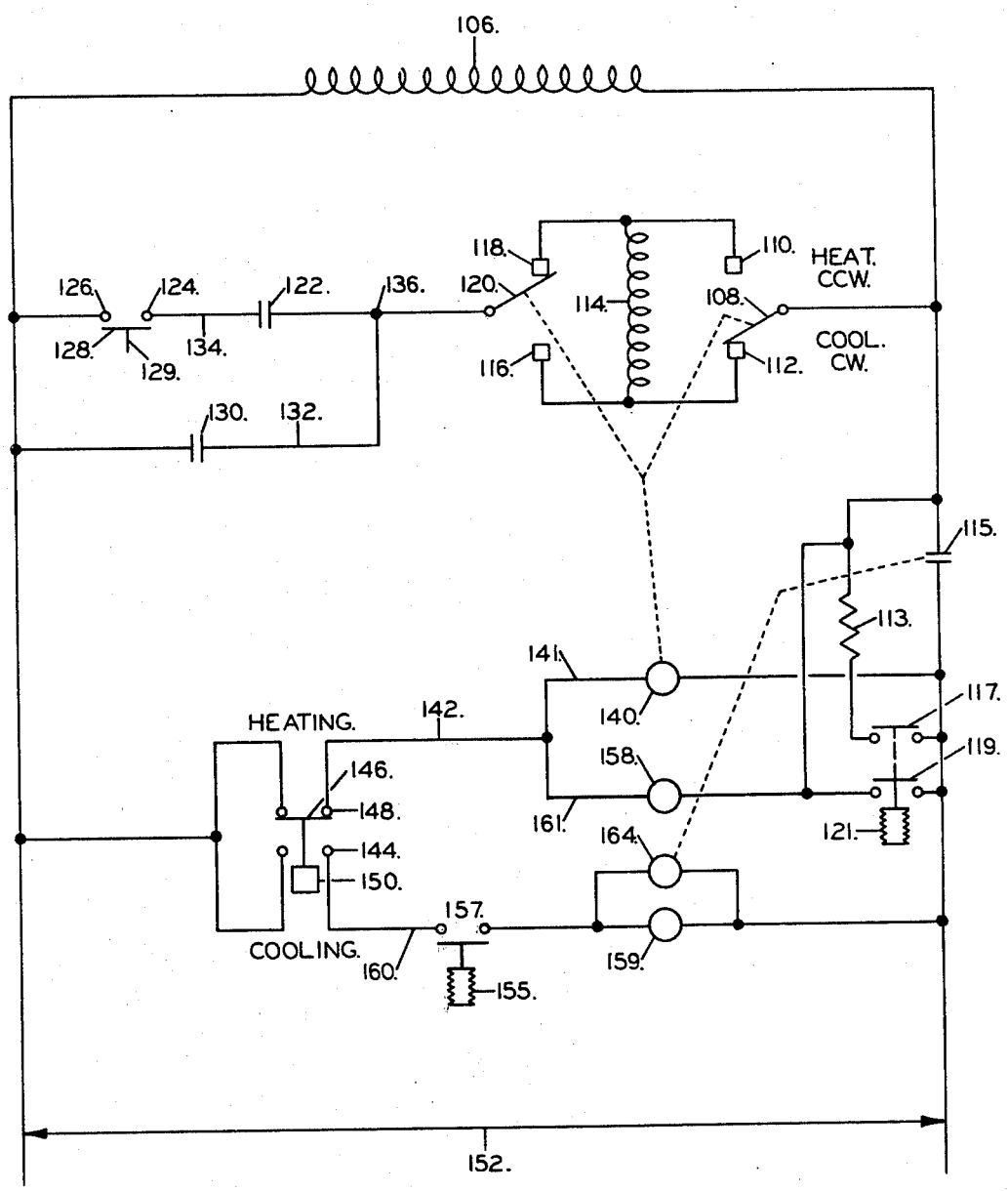
FIG. 4 is a schematic wiring diagram of a power and control circuit for the system embodying the invention.

FIG. 4 is a schematic wiring diagram where the control and power circuits for the air moving, heating and cooling system of the invention. Main power supply 152, typically of 230 volts and with a frequency of 60 Hz, is supplied to the equipment. The main power winding 106 of the motor 60 is connected across the line in series with magnetically operated switch having contacts 115; start or phase winding 114 is connected via a double pole double throw relay having coil 140, to allow the motor to start in either direction. Motor centrifugal switch 129 is normally closed when the motor is stopped but is centrifugally opened when the motor approaches its normal operating speed. Capacitor 122 is typically of the electrolytic type and of relatively high capacity, for instance, 150 microfarads and provides for high current flow through the phase or starting winding 114 required to bring the motor up to speed with minimum delay. Run capacitor 130 is generally of the paper oil filled type and has a much smaller capacity, typically 8 to 10 microfarads. This capacitor remains in series with the phase winding 114 during all conditions of motor starting and running. With coil 140 deenergized, on cooling cycle, switch elements 120 and 108 are in the position shown and the motor will operate in a clockwise direction. When coil 140 is energized, on heating cycle, switch element 120 then communicates with contact 116, and switch element 108 then communicates with switch element 110 and the motor will operate in a counterclockwise direction.

Switch 146 is the selector switch that determines whether the system will be in heating or in cooling mode. It is actuated by thermostatic element 150 which typically senses the temperature of the room to be controlled. When the room temperature is below the set point of the element 150, the switch 148 bridges contacts 146 and supplies power to the heating controls by way of wires 142, 141 and 161. When switch 148 is in its heating mode, magnetic coil 140 is energized, causing switch elements 108 and 120 to be in a position to start the motor in the heating counterclockwise direction when power is supplied.

When room thermostat 121 senses the need for heat, it first closes only contact 117. This causes reduced voltage to be fed to motor 60, comprising run winding 106 and start winding 114, by virtue of the voltage dropping resistor 113. The reduced voltage causes motor 60 to operate at substantially reduced speed. In this first heating stage stratified warm air, which has risen to the top of the occupied enclosure, is gradually withdrawn from its position at the top of the room and is slowly circulated to and discharged from the outlets located in the lower portion of the room, eliminating the stratification and using the stratified warm air from the top of the room to provide cost-free heating. Should the temperature of the room not respond adequately, and thermostat 121 require more heat, then contact 119 will close. Contact 119 performs two functions simultaneously: it supplies power direct to windings 106 and 114 of motor 60, bypassing voltage dropping resistor 113, and it supplies power to magnetic coil 158 which actuates the heating means of heating coil 68 in air conditioning enclosure 4 (FIG. 2). Under summer conditions, when cooling is required, the changeover thermostat 150 will cause switch 146 to move to a position where it bridges contacts 144, supplying power to the cooling control circuit. In doing so, it removes power from magnetic coil 140, causing switch 108 to move to make contact with contact 110 and switch 120 to move to make contact with contact 116, causing the motor when energized to operate in a clockwise mode. When the room becomes sufficiently warm to cause room cooling thermostat 155 to close its contacts 157, magnetic coils 164 and 159 are actuated. Contact 164 causes switch 115 to close, supplying full voltage directly to the motor, causing the fan to operate at its highest speed and its most efficient mode since it is operating with the concave fan face acting to move air through the system. Magnetic coil 159 serves to actuate the cooling mechanism whereby cooling is supplied to the cooling coil 78 (FIG. 2).

Figure 5:
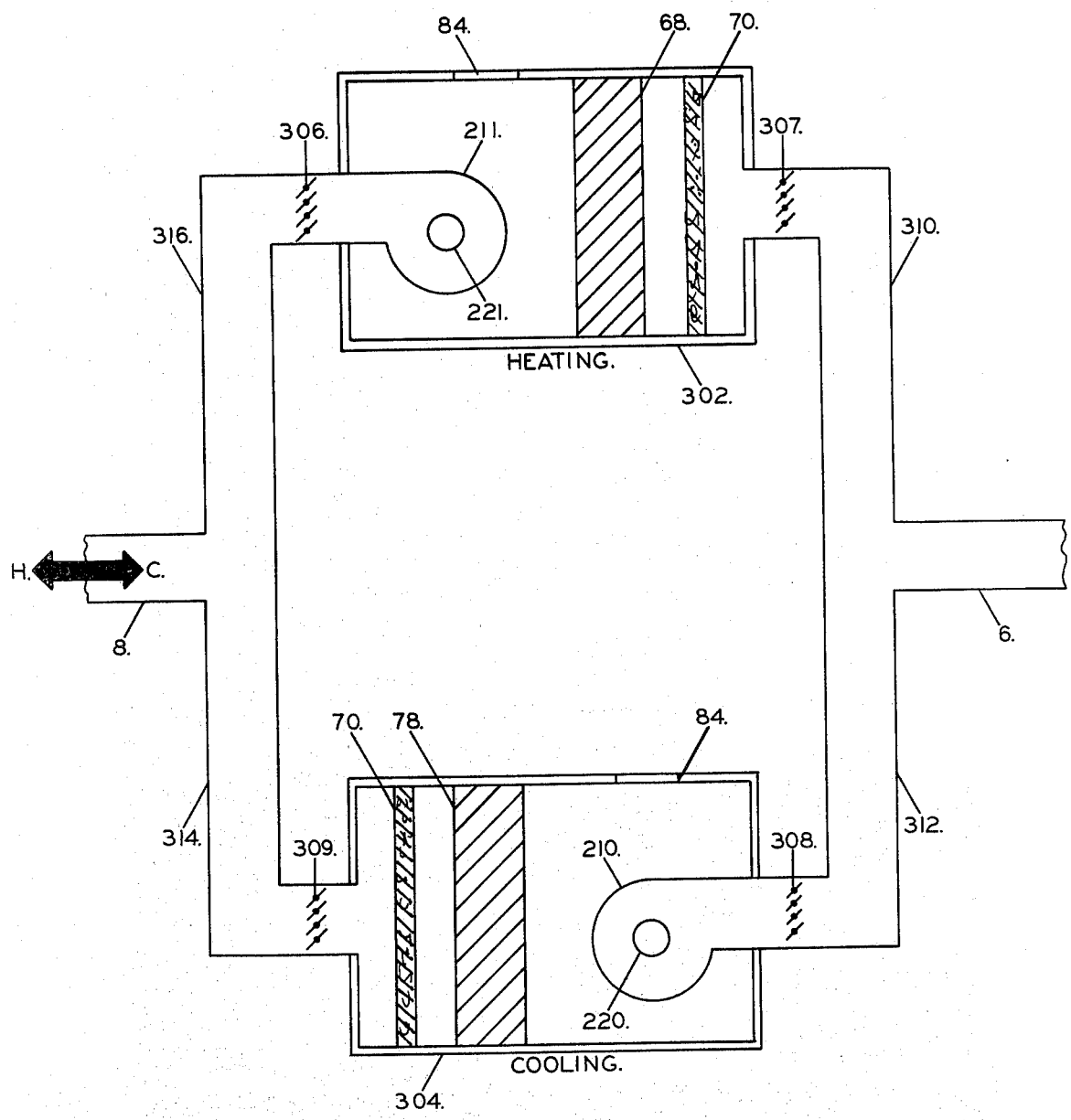
FIG. 5 shows separate fan coil heating and fan coil cooling packages with reverse flow preventing dampers to achieve the objects of the invention.

FIG. 5 shows the invention of FIG. 1 but with separate heating and cooling packages substituted for combined air conditioning 4 with its reversible fan. FIG. 5 cooling fan coil unit 304 contains cooling coil 78, filter 70 and fan 210 driven by motor 220. Fan 210 is selected and driven to provide the correct air flow for most satisfactory cooling. Dampers 308 and 309, located at the air outlet and air inlet of cooling unit 304, may be manually or automatically actuated to open when cooling is desired and closed when cooling is not desired, or heating is desired. If automatic, these dampers would be actuated in response to an activity of heating/cooling changeover thermostat 148/150 (FIG. 4). Heating fan coil unit 302 contains heating coil 68, filter 70 and fan 211, driven by motor 221. The fan 211 is selected to provide the correct air flow for first and second stage heating as described in connection with the wiring diagram of FIG. 4. Dampers 306 and 307, located at the air outlet and air inlet of the heating fan coil unit 302 are closed during cooling operation and open during both stages of heating. The operation of the dampers will also be initiated by the action of heating/cooling thermostat 148. During cooling operation, dampers 306 and 307 are closed, motor 221 is stopped, dampers 308 and 309 are open, fan motor 220 is actuated along with the means to provide cooling to cooling coil 78. The cooled air discharged by fan 210 is delivered through plenum 312 and duct 6 to the upper vents 32, 34 and 36 of FIG. 1. When heating is required, dampers 308 and 309 are closed and the dampers 306 and 307 are open. Fan 211 is then actuated with or without the energization of heating coil 68 in order to provide a first and a second stage of heating with the warmed air supplied to lower outlets 26, 28, 29 and 30 of FIG. 1.

Figure 6:
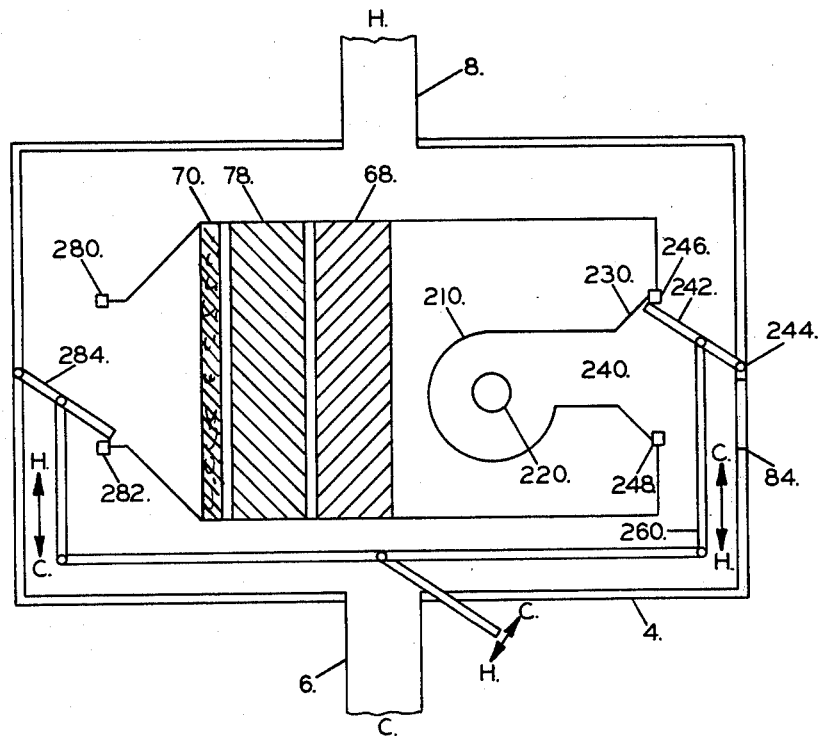
FIG. 6 shows a cross section of a fan coil package utilizing a uni-directional fan together with a set of air flow reversing dampers to achieve the purposes of the invention.

FIG. 6 contains a single fan coil heating and cooling unit containing heating coil 68 and cooling coil 78 along with air filter 70. Uni-directional fan 210 is driven by motor 220. Ducts 6 for receiving and discharging cooling air and ducts 8 for receiving and discharging heated air are utilized for these purposes by the actuation of dampers 284 and 242, which are controlled by linkages 260 either manually or automatically. During the cooling cycle, dampers 242 and 284 connect the fan discharge to the upper vents via duct 6. During heating, damper 242 is shifted to mate with its closing element 248; damper 284 is shifted to mate with its element 280, and the warm air discharged by fan 210 is discharged to lower level outlets via duct 8.

It should be apparent that may idea is capable of embodiment in various specifically different forms and while the forms illustrated are preferred because of their simplicity and demonstrated efficiency, the possibility of other embodiments is recognized and the structures above, described in detail, are for the purpose of illustration and their should be implied no limitations to the scope of my invention other than those expressed in the following claims.

I claim:
1. A temperature conditioning system for a room having a heating mode and a cooling mode, comprising
first vent means positioned high in the room for delivering cooled air to the room;
second vent means positioned low in the room for delivering heated air to the room;
duct means for conveying air, connecting first and second vent means
cooling means, and heating means for temperature conditioning the air flowing in the duct means
non-reversible fan means for causing air to flow uni-directionally in sequence through the cooling means and heating means, and
reversible damper means for causing the air to flow through the duct means from first vent means to second vent means during heating and from second vent means to first vent means during cooling.

2. A temperature conditioning system for a room having a heating mode and a cooling mode, comprising
first vent means positioned high in the room for delivering cooled air to the room;
second vent means positioned low in the room for delivering heated air to the room;
duct means for conveying air, connecting first and second vent means;
cooling means;
first non-reversible fan means for moving air from the low vent through the cooling means to the high vent;
heating means;
second non-reversible fan means for moving air from the high vent through the heating means to the low vent; and
reversible damper means for allowing air movement by first fan means and preventing air movement by second fan means in cooling mode and preventing air movement by first fan means and allowing air movement by second fan means in heating mode.

3. A heating and cooling system for a room comprising
first vent means positioned high in the room for delivering cooled air to the room second vent means positioned low in the room for delivering heated air to the room duct means for conveying air connecting first and second vent means cooling means and heating means having ON and OFF conditions for alternately cooling and actively and passively heating the room means for causing the air to flow from the second vent to the first vent at highest velocity while cooling, and means for causing the air to flow from the first vent to the second vent at lesser velocity while actively heating, and means for causing the air to flow from the first vent to the second at least velocity while passively heating.

4. A system as in claim 3 where the means for causing the air to flow from first vent to second vent and from second vent to first vent is a reversible rotation fan.

5. A system as in claim 4 where the fan characteristics cause it to deliver more air in one direction of rotation than the other.

6. A heating and cooling system for a room comprising first vent means positioned high in the room for delivering cooled air to the room;

second vent means positioned low in the room for delivering heated air to the room;

duct means for conveying air connecting first and second vent means;

cooling means and heating means for alternately cooling and heating the room;

reversible rotation fan means for delivering more air when blowing in one direction than the other, said fan means constituting means for causing the air to flow from the second vent to the first vent at higher velocity while cooling, and for causing the air to flow from the first vent to the second vent at lesser velocity while heating.

* * * * *